(12) United States Patent
Hill

(10) Patent No.: US 8,749,433 B2
(45) Date of Patent: Jun. 10, 2014

(54) MULTIPLEXING RECEIVER SYSTEM

(75) Inventor: Edward Hill, Portsmouth, NH (US)

(73) Assignee: Position Imaging, Inc., Portsmouth, NH (US)

( * ) Notice: Subject to any disclaimer, the term of this patent is extended or adjusted under 35 U.S.C. 154(b) by 139 days.

(21) Appl. No.: 13/079,800

(22) Filed: Apr. 4, 2011

(65) Prior Publication Data

US 2011/0241942 A1    Oct. 6, 2011

Related U.S. Application Data

(60) Provisional application No. 61/320,512, filed on Apr. 2, 2010.

(51) Int. Cl.
*G01S 5/06*    (2006.01)

(52) U.S. Cl.
USPC ............................................ 342/387; 342/465

(58) Field of Classification Search
CPC .................................... G01S 5/06; H01Q 3/24
USPC ........................................ 342/387, 450–465
See application file for complete search history.

(56) References Cited

U.S. PATENT DOCUMENTS

| | | | | |
|---|---|---|---|---|
| 3,940,700 A * | 2/1976 | Fischer | | 343/894 |
| 5,010,343 A * | 4/1991 | Andersson | | 342/432 |
| 5,426,438 A * | 6/1995 | Peavey et al. | | 342/433 |
| 5,574,468 A * | 11/1996 | Rose | | 342/442 |
| 5,600,330 A * | 2/1997 | Blood | | 342/463 |
| 5,657,026 A * | 8/1997 | Culpepper et al. | | 342/374 |
| 6,593,885 B2 * | 7/2003 | Wisherd et al. | | 342/463 |
| 6,683,568 B1 * | 1/2004 | James et al. | | 342/387 |
| 7,443,342 B2 * | 10/2008 | Shirai et al. | | 342/387 |
| 7,646,330 B2 * | 1/2010 | Karr | | 342/44 |
| 2003/0053492 A1 * | 3/2003 | Matsunaga | | 370/537 |
| 2006/0066485 A1 | 3/2006 | Min | | |
| 2008/0048913 A1 * | 2/2008 | Macias et al. | | 342/463 |
| 2008/0204322 A1 * | 8/2008 | Oswald et al. | | 342/465 |
| 2011/0210843 A1 * | 9/2011 | Kummetz | | 340/517 |
| 2011/0241942 A1 * | 10/2011 | Hill | | 342/451 |

* cited by examiner

*Primary Examiner* — Cassie Galt
(74) *Attorney, Agent, or Firm* — Schmeiser, Olsen & Watts LLP

(57) ABSTRACT

A position tracking system includes a transmitter constructed and arranged to emit a electromagnetic signal and an array of at least three receiver antennae. Each of the at least three receiver antennae is constructed and arranged to receive the electromagnetic signal emitted from the transmitter. The position tracking system also includes a receiver channel disposed in electrical communication with each of the at least three receiver antennae. The receiver channel is constructed and arranged to receive the electromagnetic signal from each of the at least three receiver antennae. The position tracking system also includes a data processing component disposed in electrical communication with the receiver channel. The data processing component is constructed and arranged to calculate the position of the transmitter by comparing the electromagnetic signal received at each receiver antennae.

8 Claims, 4 Drawing Sheets

US 8,749,433 B2

MULTIPLEXING RECEIVER SYSTEM

CROSS REFERENCE TO RELATED APPLICATIONS

This patent application claims the benefit of U.S. Provisional Patent Application No. 61/320,512 filed on Apr. 2, 2010, entitled, "MULTIPLEXING RECEIVER SYSTEM", the contents and teachings of which are hereby incorporated by reference in their entirety.

BACKGROUND OF THE INVENTION

1. Field of the Invention

The invention relates generally to wireless electronic devices. In particular, the invention relates to the use of wireless electronic devices for position tracking.

2. Description of the Prior Art

Position tracking involves identifying an entity's location in a pre-defined space (e.g., two dimensional or three dimensional space). Certain methods for position tracking involve the use of a wireless transmitter/transducer (e.g., an electronic tag) that is tracked by an array of receiver devices. For example, one method to track the position of a radio signal emitting tag is to use the tag (of which there may be more than one) signal's amplitude or the tag signal's time differences of arrival at various receiver devices at known locations to determine the tag's position. By comparing the tag's signal time of arrival, time difference of arrival, or signal strength at each receiver's known position, a position tracking system uses triangulation or trilateration to determine the position of the tag.

In these types of position tracking systems, at least three receiver devices at known positions are needed to determine a two dimensional position recording of the tag, and at least four receiver devices at known positions are needed to determine a three dimensional position recording of the tag. The receiver devices in these types of position tracking systems each include a receiver antenna and a receiver channel.

SUMMARY OF THE INVENTION

Unfortunately there are deficiencies to the above described position tracking systems. For example, since each receiver device contains its own channel, the cost of the electronics associated with conventional position tracking systems is too high for many applications (e.g., tracking computer mice, video game controllers, etc.).

In contrast to the above described conventional position tracking system, an improved position tracking system includes an array of receiver antennas connected to a single receiver channel via a multiplexing device. The reduction to a single receiver channel significantly reduces the electrical component costs of assembling a position tracking system while maintain a high degree of accuracy and precision.

For example, one embodiment is directed to a position tracking system. The position tracking system includes a transmitter constructed and arranged to emit a electromagnetic signal and an array of at least three receiver antennae. Each of the at least three receiver antennae is constructed and arranged to receive the electromagnetic signal emitted from the transmitter. The position tracking system also includes a receiver channel disposed in electrical communication with each of the at least three receiver antennae. The receiver channel is constructed and arranged to receive the electromagnetic signal from each of the at least three receiver antennae. The position tracking system also includes a data processing component disposed in electrical communication with the receiver channel. The data processing component is constructed and arranged to calculate the position of the transmitter by comparing the electromagnetic signal received at each receiver antennae.

The position tracking system may calculate the position of a transmitter in several different ways. For example, in a signal strength comparison system, the receiver channel includes Received Signal Strength Indicator (RSSI) circuitry and an Analog to Digital Converter (ADC) circuitry. The data processing component compares the transmitter signal's amplitude at each receiver antenna.

In another example, such as a time comparison system, the receiver channel includes phase timing correlation circuitry for comparing the transmitter signal's time difference of arrival and ADC circuitry. The data processing component processes the timing data.

Signal strength tracking systems work well in an environment that does not require high accuracy position detection for the transmitter tags. However, in some applications, requirements may be much more demanding with centimeter or even sub-millimeter accuracy requirements. In these applications, timing information generated by radio signal phase comparisons is more effective for improving position accuracy.

Certain computer-based applications that track the position of an interactive peripheral device (e.g., a transmitter tag) and use that position data to engage a software program require high tracking accuracy. In these applications, the tag is registered with screen images provided by software. To make this tag's operation effective for a user (e.g., to control a cursor on a screen) very high position accuracies provide realistic interaction between the user operating the tag and the software program. The signal's time of arrival comparison approach for tag tracking may provide higher accuracies but in some of these applications, low cost is a focus for mainstream consumer products. For example, a system used to improve the interactive functionality of typical computer peripherals such as computer mice, game controllers, and other human-computer interactive peripherals should be low cost to be commercially competitive.

DETAILED DESCRIPTION OF THE PREFERRED EMBODIMENT

Figure 1:
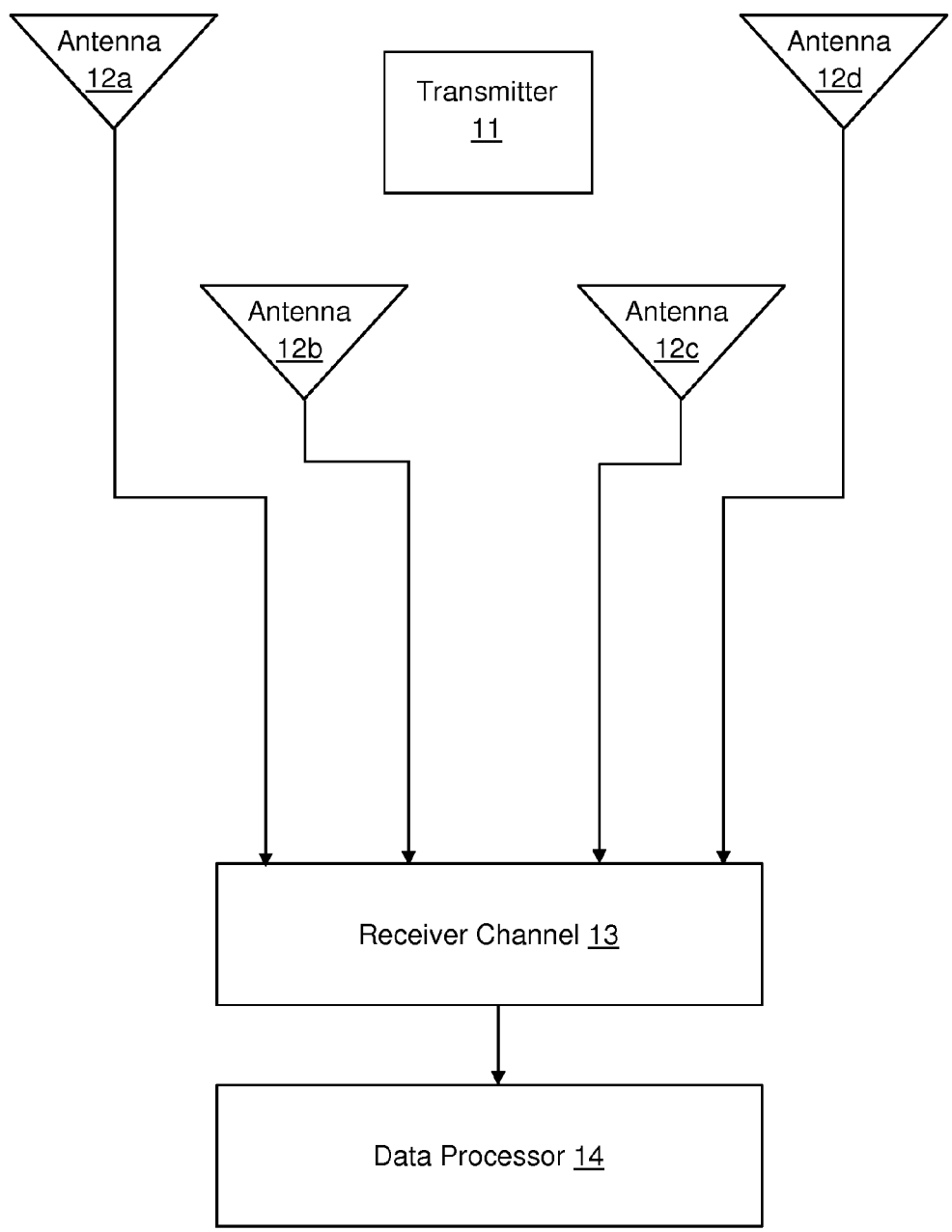
FIG. 1 is a block diagram of a position tracking system.

The preferred embodiment(s) of the present invention is illustrated in FIGS. 1-4.

An improved position tracking system includes an array of receiver antennas connected to a single receiver channel via a multiplexing device. The reduction to a single receiver channel significantly reduces the electrical component costs of assembling a position tracking system while maintain a high degree of accuracy and precision.

For example, in a simple configuration for three dimensional tag position tracking, a tag transmits a signal that is received by at least four receiver antennae. One receiver antenna acts as the reference antenna to compare the time difference of arrival of the tag's signal at each of the other three receiver antennae. This timing information and the antennae's known positions allow the system, through simple triangulation or trilateration techniques, to determine the physical position of the tag. However, in this system, using one receiver channel for each receiver antenna could prove costly, especially for applications that require low price points.

In some arrangements, the position tracking system utilizes time difference of arrival for position detection. In these arrangements, a receiver channel includes a de-spreader circuit (De-Spreader) having an amplifier connected to the antenna and a Delay Lock Loop (DLL) for carrier recovery, a Phase Comparator Circuit (PCC), an Analog to Digital Converter (ADC), and a data processor for position calculation and data (message) processing. This receiver channel may or may not include a data processor depending on application needs. For example, in a game console application, manufacturers may want data processing (with position calculation) to occur in the console processor which would allow the receiver channel to end at the ADC circuit.

Connecting two or more of the receiver antennae to a single receiver channel is a major cost savings in hardware and limits circuit board space required by the system. One receiver channel is used for all four receiver antennae. To enable this function, a multiplexing technique allows the receiver channel to multiplex between each antenna. To accomplish this multiplexing feature, our single (for all four antennae) receiver channel also include a multiplexing switch (MUX), connected to the antennae through an electrical connection, that is capable of toggling between each antenna. The receiver channel also includes an additional Oscillator (OSC) connected to the PCC to act as an additional time reference for signal wave phase comparison for each receiver antenna input. In some applications, you could remove the need for an additional oscillator by using one (or more) receiver antenna as a reference that is constantly connected and engaged and supplies a constant time reference for the other receiver antennae that are being toggled back and forth by the receiver channel's MUX. However, when all of the receiver antennae are multiplexed to a single receiver channel an additional oscillator for a timing reference is needed.

FIG. 1 is a block diagram of a wireless position tracking system. As seen in FIG. 1, the position tracking system includes a transmitter 11 (e.g., tag) carried by/attached to/embedded on an object whose position (x, y, z) is to be determined, a receiver network including the receiver channel's antennae 12a through 12d whose relative positions ($X_i, Y_i, Z_i$) are known, a receiver channel 13 and a data processor 14. At least four receiver antennae and one transmitter are required for determining the three dimensional transmitter position within the tracking environment. In said system (receiver system), the received signal is sent to the receiver channel unit 13, from each receiver station antenna, and the individual antenna's data obtained from receiver channel 13 is sent to the data processor 14 to calculate the tag 11 position (x, y, z) by comparing the data received at each receiver antenna 12 and then display it on a computer screen or provide it to other applications for further use.

Figure 2:
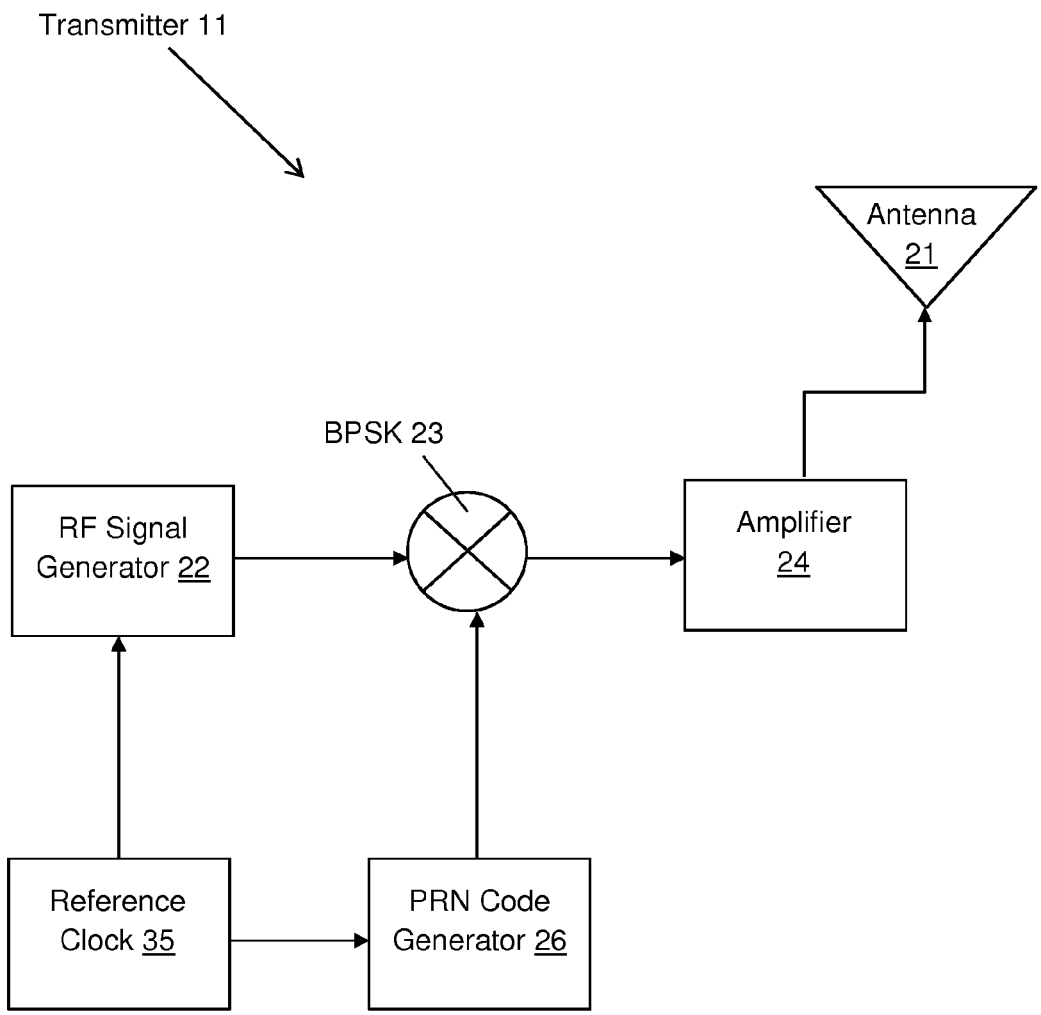
FIG. 2 is a block diagram of a transmitter of the position tracking system of FIG. 1.

FIG. 2 shows the construction of the transmitter 11. It includes an antenna 21, a RF signal generator 22, a Bi-Phase Shift Key (BPSK) modulator 23, an amplifier 24, a reference oscillator or Reference Clock 25 and a Pseudo-Noise (PN) code generator 26. The transmitter 11 associated with an object has a PN generator 26 that generates PN signals intrinsic to the object. The reference oscillator 25 provides a stable reference oscillator signal for the PN generator 26 and RF signal generator 22. The reference Oscillator 25 uses a Phase Lock Loop to generate a stable RF signal. BPSK modulator 23 provides the modulated CDMA signal to transmit. The modulated CDMA signal is transmitted via amplifier 24 and transmitter antenna 21. In some arrangements, the carrier frequency is chosen at 2.4 GHz and the PN code chip rate is chosen at 5 MHz to further stabilize the radio signal transmitted from the Tag and to provide an ID for the receiver station to identify the Tag and perform synchronization.

Figure 3:
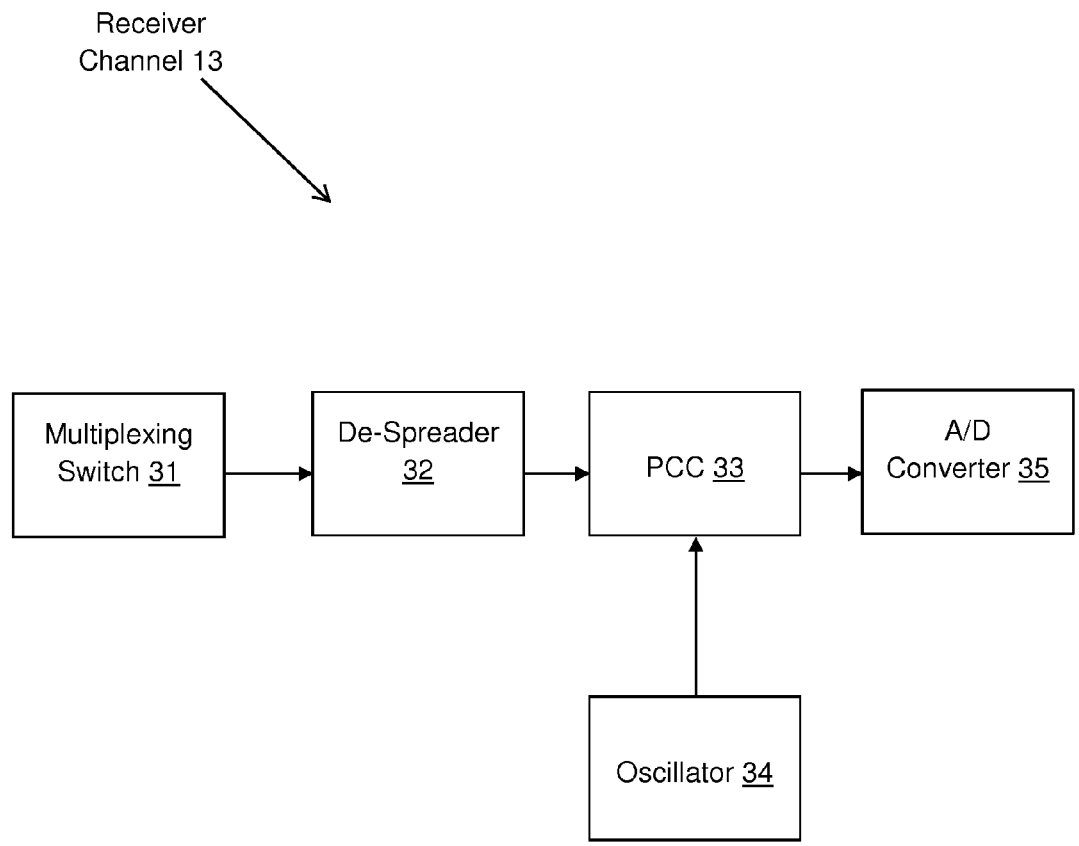
FIG. 3 is a block diagram of a receiver channel of the position tracking system of FIG. 1.

FIG. 3 shows the construction of a receiver channel 13 that is equipped to multiplex or switch between all four antennae. It includes a multiplexing switch (MUX) 31, a de-spreader circuit 32, a Phase Comparator Circuit (PCC) 33, an Oscillator (OSC) 34, and an Analog to Digital Converter circuit (ADC) 35. In this embodiment, this simple multiplexing receiver channel is connected to an external Data Processor 36 but this Data Processor 36 could also be part of the actual receiver channel 13. The Data Processor controls the MUX 31 and causes it to switch from one receiver antenna 12 to another through the electrical connection that connects each antenna 12. The MUX 31 remains on one antenna 12 connection for a period of time to extract the signal data received at that individual antenna 12. After the period is complete, the Data Processor tells the MUX 31 to switch to another antenna 12 connection to extract the signal data received at that individual antenna 12. This process repeats such that each individual antenna's 12 received signal from the tag 11 is received and processed at the Data Processor.

Figure 4:
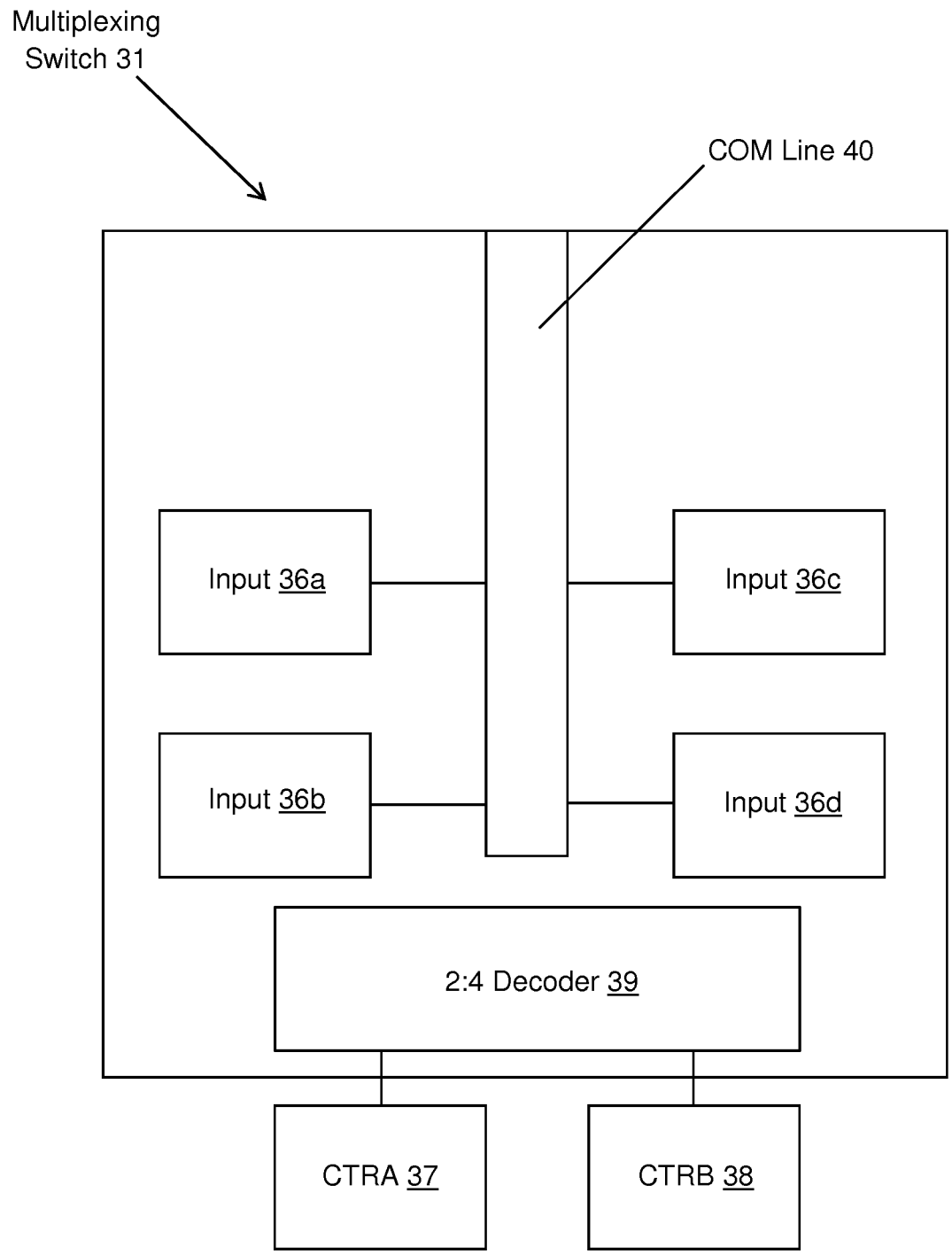
FIG. 4 is a block diagram of a multiplexing switch of the receiver channel of FIG. 3.

In FIG. 4, you can see a typical diagram of this switching circuit 31. In this figure, input 36a-d represent the electrical connections to the antennae 12a-d. These connections are initiated by the processor which also initiates the sequence and timing of the switching. The CTRA 37 and CTRB 38 inputs are the control connections from the processor to operate the switching function initiated by that processor. The 2:4 Decoder 39 translates control signals from the processor to activate which antenna 12 connection is engaged. The COM line 40 connects each individual antenna 12, one at a time, to the actual receiver hardware.

In FIG. 3, the de-spreader circuitry 32 de-spreads the received spread signal. This signal, sent from the tag 11, is spread over some bandwidth through basic Bi-Phase Shift Keying (BPSK) or similar modulation technique. In some arrangements, a BPSK signal is spread over 5 MHz to provide a more stable radio link for signal integrity. By spreading the signal, the system can better identify Tag ID during simultaneous use through a pseudo-random noise code transmission and a wider radio spectrum can improve multipath rejection. However, the system can operate through a narrowband radio link such as the 500 KHz Frequency Shift Keying (FSK) operation used for Bluetooth communication. In either case, the receiver station de-spreads the signal by synchronizing the pseudo-random code, known by the Data Processor 14 as the tag's ID, sent by the tag 11 over the 5 MHz bandwidth. Once this code is synchronized, the tag is identified at the Data Processor and the tag's timing data used for comparisons at each individual antenna can be extracted from the signals.

After the tag 11 signal is de-spread by the de-spreader circuit 32 and synchronized, the PCC 33 compares the timing differences between the signals received from the tag 11 at each antenna 12 using the OSC 34 for timing comparisons. In this embodiment, the OSC 34 is chosen to be the timing reference. The timing data received from the tag 11 at receiver antenna 12a and the OSC 34, receiver antenna 12b and OSC, receiver 12c and OSC 34, and receiver antenna 12d and OSC is measured. The timing differences from each receiver antenna's received signal and the OSC's reference signal, with the known physical positions of each receiver antenna 12, is used to calculate the tag 11 position through simple trilateration or triangulation.

In some arrangements, the system's data processor will calculate the position of the tag 11 by using a basic equation with known relative three dimensional positions of the receiver antennae 12. A simple example of such a Tracking Equation is below:

$$f_1 = \sqrt{(x_2-x)^2+(y_2-y)^2+(z_2-z)^2} - \sqrt{(x_1-x)^2+(y_1-y)^2+(z_1-z)^2}$$

$$f_2 = \sqrt{(x_3-x)^2+(y_3-y)^2+(z_3-z)^2} - \sqrt{(x_1-x)^2+(y_1-y)^2+(z_1-z)^2}$$

$$f_3 = \sqrt{(x_4-x)^2+(y_4-y)^2+(z_4-z)^2} - \sqrt{(x_1-x)^2+(y_1-y)^2+(z_1-z)^2}$$

Where $(x_i, y_i, z_i, I=1, 2, 3, 4)$ are the positions of the receiver antennae and $(x, y, z)$ is the position of the tag 11 to be determined.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A position tracking system comprising:
   a transmitter constructed and arranged to emit an electromagnetic signal;
   an array of at least three receiver antennae, each of the at least three receiver antennae being disposed at a known three-dimensional position and constructed and arranged to receive the electromagnetic signal emitted from the transmitter;
   a single receiver channel disposed in electrical communication with each of the at least three receiver antennae, the single receiver channel constructed and arranged to multiplex among the at least three receiver antennae in order to receive the electromagnetic signal from each of the at least three receiver antennae, the single receiver channel further including oscillator circuitry constructed and arranged to provide a reference signal and phase comparator circuitry constructed and arranged to compare timing differences between the electromagnetic signal received at each of the at least three receiver antennae and the reference signal provided by the oscillator circuitry of the receiver channel; and
   a data processing component disposed in electrical communication with the single receiver channel to receive the timing differences, the data processing component constructed and arranged to calculate a position of the transmitter using the timing differences and the known three-dimensional position of each of the at least three receiver antennae.

2. The position tracking system of claim 1, wherein the receiver channel includes a switching circuit constructed and arranged to toggle among the at least three receiver antennae in order to receive the electromagnetic signal from each of the at least three receiver antennae.

3. The position tracking system of claim 1, wherein the data processing component is further constructed and arranged to calculate a time-of-arrival difference between the transmitter and each of the at least three receiver antennae to determine the position of the transmitter.

4. The position tracking system of claim 1, wherein the data processing component is further constructed and arranged to compare an amplitude of the electromagnetic signal at each of the at least three receiver antennae to determine the position of the transmitter.

5. The position tracking system of claim 1, wherein the single receiver channel includes received signal strength indicator (RSSI) circuitry constructed and arranged to measure the amplitude of the electromagnetic signal at each of the at least three receiver antennae.

6. A position tracking system comprising:
   at least three radio frequency (RF) receiver antennae receiving an RF signal emitted from an RF transmitter, each of the RF receiver antenna being disposed at a known three-dimensional position;
   a receiver channel disposed in electrical communication with each of the at least three receiver antennae, the single receiver channel multiplexing among the at least three receiver antennae in order to receive the RF signal received by each of the at least three receiver antennae, the receiver channel further including oscillator circuitry that provides a reference signal and phase comparator circuitry that compares timing differences between the RF signal received at each of the at least three receiver antennae and the reference signal provided by the oscillator circuitry; and
   a data processor calculating a three-dimensional position of the RF transmitter using the timing differences and the known three-dimensional position of each of the at least three receiver antennae.

7. The position tracking system of claim 6, wherein the data processor is part of the receiver channel.

8. A method of tracking a position of a radio frequency (RF) transmitter, the method comprising:
   receiving an RF signal emitted from an RF transmitter by at least three radio frequency (RF) receiver antennae disposed at known three-dimensional positions;
   multiplexing, by a receiver channel, among the at least three receiver antennae in order to receive the RF signal received by each of the at least three receiver antennae;
   producing, by oscillator circuitry of the receiver channel, a reference signal;
   comparing, by the receiver channel, timing differences between the RF signal received at each of the at least three receiver antennae and the reference signal provided by the oscillator circuitry; and
   calculating a three-dimensional position of the RF transmitter using the timing differences and the known three-dimensional position of each of the at least three receiver antennae.

* * * * *